United States Patent [19]

Dohmeier

[11] Patent Number: 4,915,211
[45] Date of Patent: Apr. 10, 1990

[54] CONVEYOR BELT SCRAPER

[75] Inventor: Hans-Otto Dohmeier, Johannesburg, South Africa

[73] Assignee: Karl-Heinz Erdmann, Johannesburg, South Africa; a part interest

[21] Appl. No.: 157,732

[22] Filed: Feb. 18, 1988

[51] Int. Cl.$^4$ ............................................. B65G 45/00
[52] U.S. Cl. ..................................... 198/499; 15/256.5
[58] Field of Search .............. 198/497, 499; 15/256.5, 15/256.51

[56] References Cited

U.S. PATENT DOCUMENTS

| | | | |
|---|---|---|---|
| 2,545,882 | 3/1951 | Hall | 198/499 |
| 2,545,883 | 3/1951 | Hall | 198/499 |
| 4,290,520 | 9/1981 | Rhodes | 198/499 |
| 4,696,389 | 9/1987 | Schwarze | 198/499 |
| 4,768,644 | 9/1988 | Cromm | 198/499 |

FOREIGN PATENT DOCUMENTS 2005703  8/1971  Fed. Rep. of Germany ...... 198/499

Primary Examiner—Joseph E. Valenza
Attorney, Agent, or Firm—Ladas & Parry

[57] ABSTRACT

A conveyor belt scraper has an elongate supporting frame that supports an elongate blade guided to move laterally with respect to the supporting frame in a direction towards a belt to be scraped. The blade is urged into engagement with the belt by at least one elongate element that is at least partly flexible and at least partly longitudinally resilient. Structure is provided for tensioning the elongate element. Various arrangements for the elongate element in relation to the blade and construction of the elongate element are disclosed. The conveyor belt scraper also has structure for mounting two or more scraper blades so that the force with which they engage the belt to be scraped is substantially equalized.

18 Claims, 3 Drawing Sheets

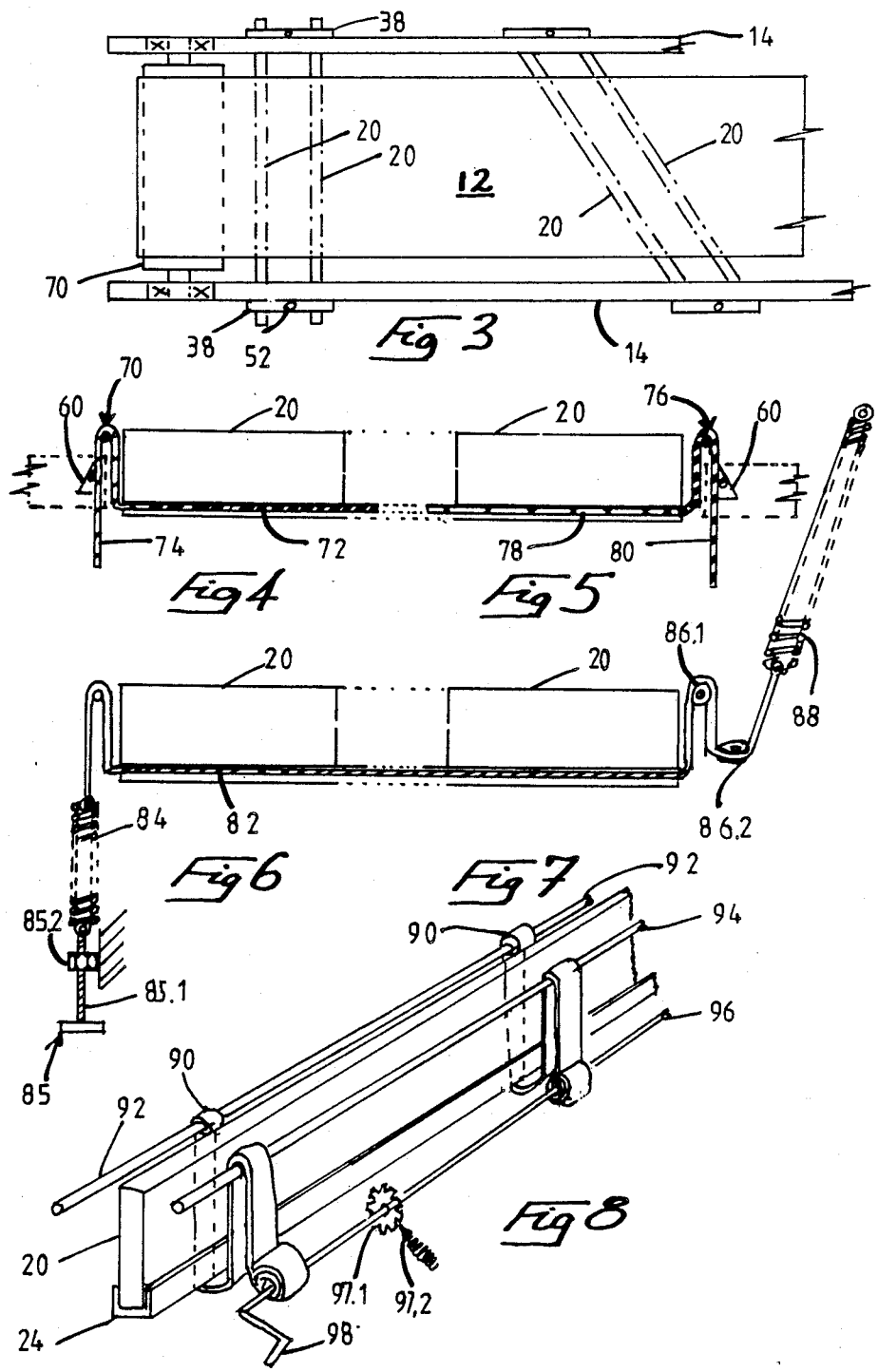

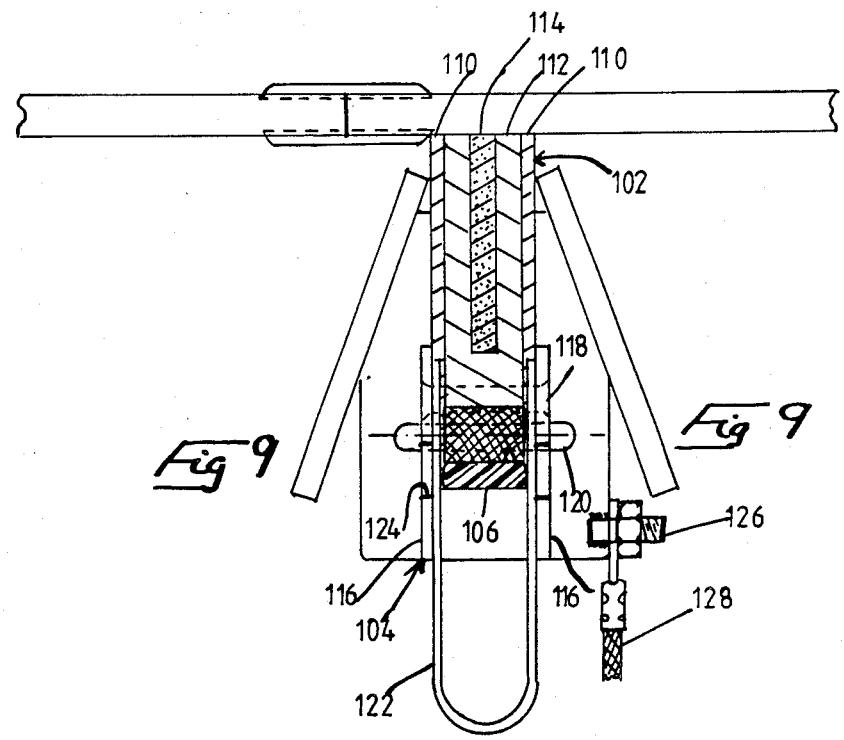
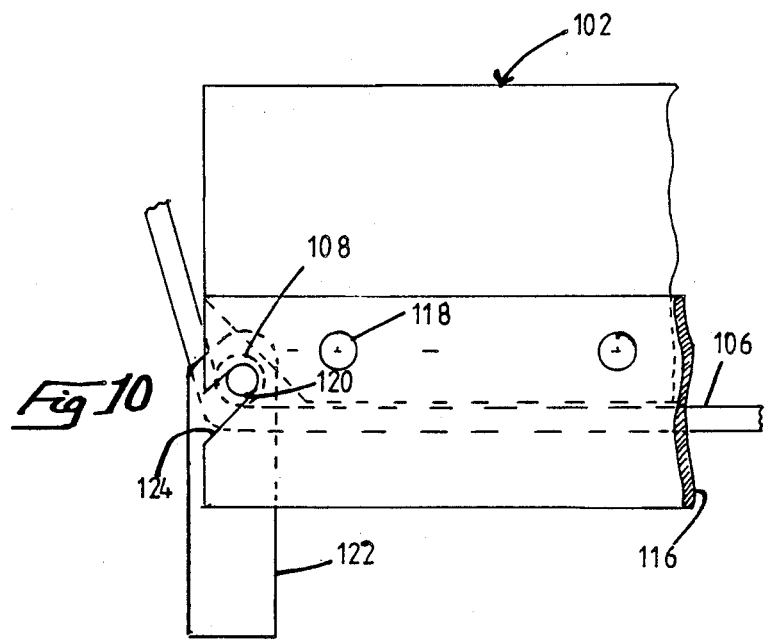

CONVEYOR BELT SCRAPER

FIELD OF THE INVENTION

This invention relates to a conveyor belt scraper or cleaner, also known as a belt scraper, comprising a supporting frame, a scraper blade mounted on the frame, and means for mounting the frame with respect to a conveyor belt.

Belt scrapers are used for cleaning residue adhering to a conveyor belt at its lower run and are usually provided adjacent the discharge roller. Scrapers intermediate the drive and discharge rollers of the conveyor may also be used.

BACKGROUND OF THE INVENTION

In order to function effectively the scraper blade must be urged against the belt with a suitable force determined by the properties of the blade, the belt, and the material to be scraped, so that optimum scraping is obtained consistent with satisfactorily low rate of wear of the blade and resistance to and damage to the belt. At the same time the scraper should be at least partly automatically adjustable so that, as the blade wears in use, it remains in satisfactory engagement with the belt. In one known system a counterbalance arrangement is used. This arrangement, while generally effective as regards the force with which the blade is urged against the belt, tends to be relatively expensive and bulky so that it may be difficult to fit within a conveyor apparatus. In another system a series of vertically arranged coiled metal springs is used. This arrangement, while more compact than the counterbalance arrangement, has a limited range of automatic self-adjustment. Adjustments can be made, but jamming of the adjustment mechanism is a problem in certain environments. In yet another system the blade is rotationally mounted for movement about an axis spaced from the belt and perpendicular to the direction of motion of the belt. The blade is biased by metal springs or elastomer buffers against the belt to absorb shocks and to follow the motion of the belt. Again the range of automatic adjustment is limited and jamming of the setting mechanism is a frequent problem in practice.

Accordingly this invention seeks to provide a belt scraper that satisfactorily ameliorates the above mentioned disadvantages, while permitting safe and relatively quick adjustment when required.

SUMMARY OF THE INVENTION

One aspect of the invention provides a conveyor belt scraper comprising an elongate supporting frame; means for mounting the supporting frame with respect to a conveyor belt; elongate blade means mounted in the frame and guided to move laterally with respect to the frame; at least one elongate element in engagement with the blade, the elongate element being at least partly flexible, and at least partly longitudinally resilient; and means for tensioning the elongate element to urge the blade against the conveyor belt.

Preferably the elongate supporting frame includes two spaced, parallel strips, the blade being slidably guided between the strips. Preferably the strips are inclined oppositely to each other so that they taper in a direction facing the belt in use whereby, in use, material scraped by the blade passes substantially freely over the frame, while replacement of the scraper blade is facilitated.

The elongate element may be entirely of a suitable resilient material, such as an appropriate elastomer, which may be natural or synthetic. Alternatively, the elongate element may be partly composed of suitable resilient material and partly of substantially inelastic material that is preferably flexible, such as woven or braided strip, for instance of canvas, nylon, polyester and the like. The resilient material may be a suitable elastomer or metal spring means. Inserts of stiff strip, such as of metal, may also be included in the elongate element, e.g. where there is a relatively long straight run.

Preferably the elongate element extends along the length of the blade. Preferably the elongate element is accommodated in a channel extending along the length of the blade, conveniently along the edge of the blade that will be remote from its working edge in use. It is also possible to have a plurality of elongate flexible elements each extending laterally with respect to the blade, having a portion parallel to the direction of belt travel, and with the elements being longitudinally spaced from one another along the length of the blade.

The blade may comprise a strip of suitable elastomer, preferably a laminated strip of at least one each of a suitable elastomer strip and a strip of a relatively harder material, such as of metal, ceramic, alumina, carbide, oxide, silicate and the like. Preferably the blade includes parallel metal strips forming a channel section between which the elongate element is guided.

The invention also includes a blade as described above.

Preferably the mounting means is constructed to engage a lateral frame of a conveyor belt apparatus, such a frame normally being provided for supporting the rollers that in turn support the belt.

Another aspect of the invention provides a mounting means for a belt scraper including a connecting means for connecting the mounting means to a frame of a conveyor belt apparatus; a supporting means for supporting the belt scraper, and first pivotal connecting means for connecting the supporting means to the connecting means, the pivotal connecting means allowing movement of the supporting means about an axis substantially parallel to the normal to the general plane of a conveyor belt to be scraped. This arrangement permits the supporting means and thus the scraper blade to be mounted perpendicular to the direction of travel of the belt or at an inclination to such perpendicular and such belt travel direction where this is desired.

The mounting means may include a second pivotal connecting means and two belt scrapers substantially parallel to each other, with the pivot axis of the second pivotal connecting means being substantially perpendicular to the direction of the belt travel in use and extending across the width of the belt. This construction permits the two belt scrapers automatically to move relatively to each other in a direction transverse to the belt substantially to equalise the forces with which the scraper blades of the two belt scrapers act against the belt.

The invention is now illustrated by way of example in the following description made with reference to the accompanying schematic drawings.

BRIEF DESCRIPTION OF THE DRAWINGS

FIG. 3 illustrates a portion of a conveyor belt apparatus fitted with two belt scrapers of the type shown in FIGS. 1 and 2;

FIGS. 4 to 7 show in side view and partly in section portions of four different embodiments of belt scraper of the invention, illustrating variants of flexible elongate elements and means for tensioning the elements to urge a blade of the scraper into contact with a belt to be scraped;

FIG. 8 shows a perspective view of a portion of yet another embodiment of belt scraper with laterally extending flexible elements for biasing the scraper blade;

FIG. 9 shows a detail of part of a belt scraper in contact with a conveyor belt; and FIG. 10 shows in side view part of an end portion of the detail of FIG. 9.

DESCRIPTION OF PREFERRED EMBODIMENTS

Figure 1:
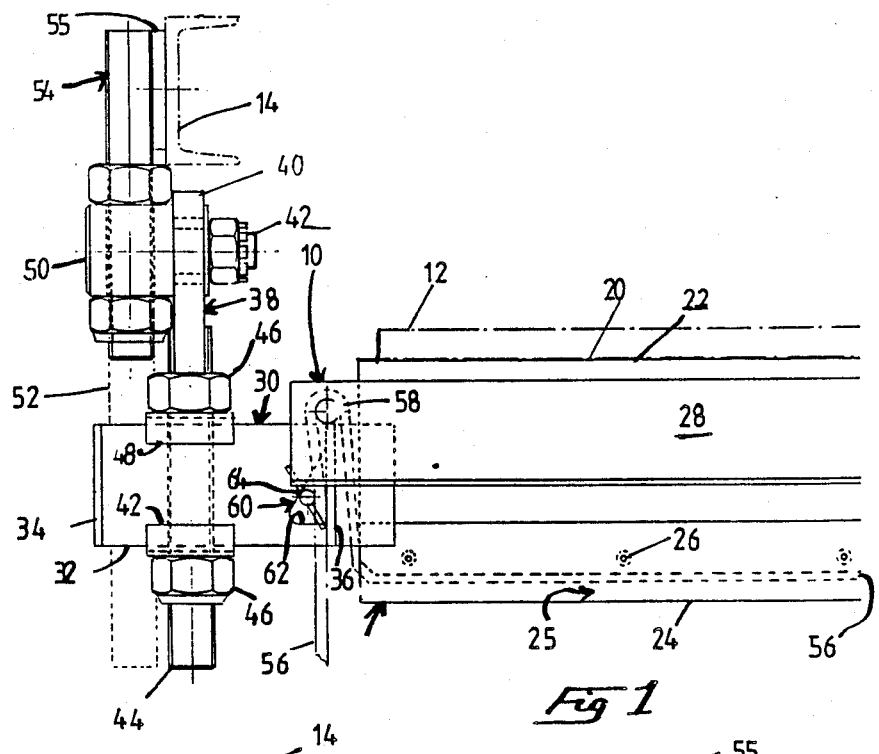
FIG. 1 shows a side view of an end portion of one embodiment of conveyor belt scraper of the invention.
Figure 2:
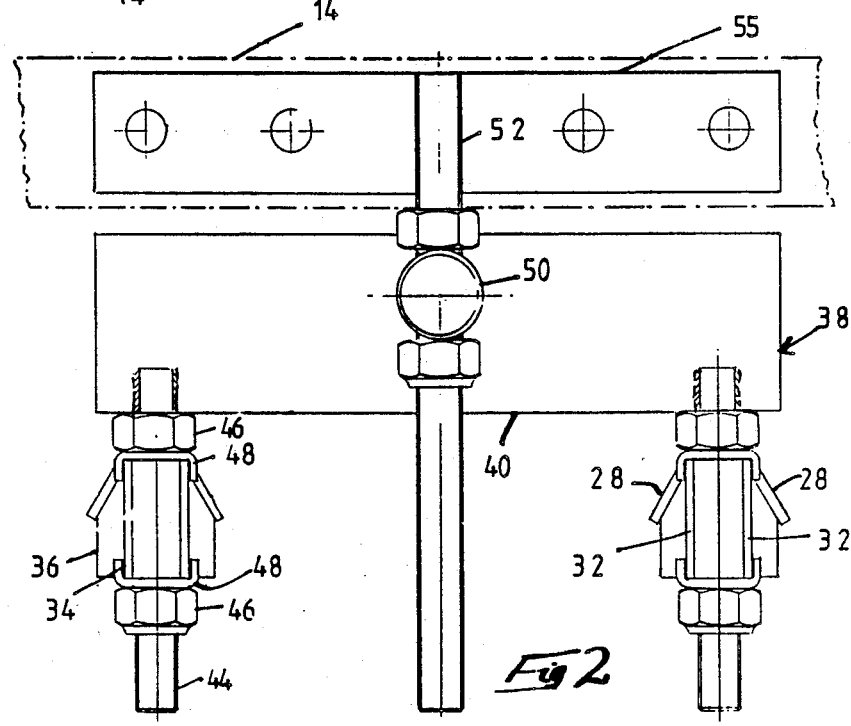
FIG. 2 shows an end view of the embodiment of FIG. 1.

FIGS. 1 and 2 of the drawings show a portion of a belt scraper 10 of the invention mounted beneath a conveyor belt 12, the scraper 10 being mounted on a channel section 14 forming part of a frame of a conveyor belt apparatus.

The belt scraper 10 comprises a pair of elongate elastsomeric blades 20 of polyurethane, each blade having an edge 22 in contact with the conveyor belt and two steel strips 24 fixed to it by rivets 26 at the edge opposite the edge 22. The strips 24 forms a downwardly open guide channel 25.

Each blade 20 is slidably guided between two relatively inclined metal strips 28, both welded at each end to a supporting piece 30 comprising two spaced metal strips that form a vertically open slot. The plates 32 are connected to each other by transverse plates 34 and 36.

The supporting piece 30 is suspended form a rotatable hangar 38 having a cross-bar 40 centrally pivoted on a threaded stud 42 for rotation in a vertical plane and two threaded rods 44 depending from the cross bar. Each supporting piece 30 is mounted on one of the rods 44 and is vertically and horizontally adjustable and lockable thereon by nuts 46 and channel shaped washers 48.

The stud 42 and a bush 50 secured to it pivotally connect the hangar 38 to a threaded rod 52 of a connecting part 54 having a mounting plate 55 securable to the channel section 14.

The blade 20 is urged upwardly to engage the belt 12 by a flexible, elongate, elastomeric band 56. The band 56 is guided in the channel 25 and over a guide roller 58 at each end of the guide plates 28. A locking mechanism 60 comprising a triangular opening 62 formed in each strip 32 and a floating, knurled, cross-pin 64 extending through the two holes 62 engages the band 56 to lock its end after it has been tensioned.

In practice the belt scraper 10 is mounted and used as follows.

First the belt scraper is mounted on the channel section 14 at an appropriate position, such as adjacent a discharge roller 70 as shown in FIG. 3, using the components 30 to 55. The height of the belt scraper relative to the belt is adjusted by moving the bush 50 up or down the rod 52 and/or by moving the supporting pieces 30 up or down the rods 44. Variations in the spacing between the frame channels 14 of different conveyors is accommodated by moving the supporting pieces laterally, i.e. horizontally, with respect to the bolts 44.

Each blade is then forced against the underneath of the lower run of the conveyor belt by pulling on one or both ends of the band 56 until the required degree of deflection of the belt has been obtained. The deflection of the belt vertically is an indication of the force with which the blade is urged against the belt. When the tension of the band 56 is released it is locked in the tensioned position by the cross pin 64 which moves upwardly wedging the band 56 between itself and the transverse plate 36. The forces exerted by the blades 20 of the two belt scrapers is automatically equalised by rotation of the hangar 38 about the stud 42.

FIG. 3 illustrates pairs of the blades 20 mounted perpendicular to and inclined to the direction of belt travel as desired.

Inclining the blades is attained by adjusting the mounting plates 55 along the channel section 14, with the hangers pivoting via the bush 50 on the rod 52 and the supporting pieces 30 pivoting on the rods 44 so that the blades 20 remain parallel to each other while moving to the desired inclination. Movement of the supporting pieces 30 transverse to the axis of each of the bolts 44 effectively changes the length of the belt scraper to allow for the increased spacing between the mounting points on the opposed frame channels 14.

FIGS. 4 to 7 shows different variants of scraper blade biasing means, only portions of the apparatus necessary for an understanding of the functioning and construction of the biasing means being shown. The variants are distinct, but pairs of variants are shown associated for assisting an understanding of the drawings only.

FIG. 4 shows a flexible element 70 comprising a length of polyester webbing 72, e.g. of the type used for safety belts in motor vehicles, which runs underneath the blade 20 and is connected adjacent the end of the blade 20 to an elastomeric band 74.

FIG. 5 shows a flexible element 76 comprising an elastomeric band 78 that passes underneath the blade 20 and is connected to webbing 80 at a position towards the end of the blade 20.

The elements 70 and 76 of FIGS. 4 and 5 are both locked, when tensioned, by a locking mechanism 60 of the type described previously.

In FIG. 6 the blade 20 is biased by a nylon strap 82 which passes underneath the blade 20 and at its end is connected to a metal coil spring 84 tensioned by an adjusting mechanism 84 including a bolt 85.1 engaged with a nut 85.2 fixed to the conveyor frame.

In FIG. 7 the strap 82 passes over a first pulley 86.1 with its axis transverse to the direction of belt travel and a second pulley 86.2 having its axis normal to the belt and engages a sufficiently long coil spring 88 extending along the length of the mounting channel 14; this is of advantage for compactness and fitting to the apparatus while permitting sufficient length of spring 88 to accommodate the expected range of extension over which the spring 88 can effectively bias the blade 20.

FIG. 8 shows a variant in which a scraper blade 20 is tensioned by a plurality of elastomeric bands 90 each passing laterally with respect to the blade underneath the blade 20, the bands 90 being longitudinally spaced from each other along the length of the blade. Each band 90 is secured at one end to a rod 92, passes beneath the blade 20, and then upwards over a spindle rod 94, and is secured to a rotatable shaft 96 at its other end. A handle 98 is provided to rotate the shaft 96 to tension the bands 90 and bias the blade 20. Reverse rotation of the shaft 96 is prevented by a suitable pawl 97.1 and ratchet 97.2 mechanism (shown schematically).

The nature of the scraper blade will vary depending on its intended application. Most commonly it is of an elastomeric material, such as polyurethane or natural rubber, such as of the type sold under the trade name Linotex (198 ). Other blades, such as of metal, ceramic and other suitable materials may also be used.

FIGS. 9 and 10 illustrate details of an end region of a part of a belt scraper including a scraper blade 102 with a longitudinal guide channel 104, a tensioning element 106 and a tensioning element guide roller 108. The blade 102 comprises an adhesively bonded laminate of outer steel plates 110, a medial strip of polyurethane 112 and a central ceramic strip 114. The guide 104 comprises two steel strips 116 secured by rivets 118 to the blade 102. The guide roller 108 comprises a bush rotatable on a shaft forming opposed trunnions 120 that pass through registering holes in a U-shaped holding clip 122 and that rest in guide slots 124 in the ends of the strips 116. A stud 126 secured a braided copper strap 128, the other end of the strap being connected to electrical ground, e.g. via a conveyor frame, whereby static electricity on the belt can be dissipated.

In use, this embodiment is installed substantially as described above, but has several functional advantages. The laminated blade has very good scraping properties under most conditions and tests have shown it functions effectively to scrape most materials whether wet or dry and at high, medium and low speeds. Also it may be used satisfactorily with either clip or spliced joints in the belt (a clip joint is shown in FIG. 9), and regardless of the direction of belt travel. The guide roller insures relatively free movement of the tensioning elements so that when one end of the element 106 is pulled to tension it, the tension is rapidly distributed evenly along the element since friction forces are minimised. The holding clip 122 permits the tensioning element 106 conveniently to be pulled downward out of contract with the blade when the blade is to be removed or replaced.

An advantage of the embodiments described above is that they can be adjusted from the sides of the conveyor belt so that safety is maintained, while adjustments can be made without stopping the conveyor if need be. Installation and replacement of the blades 20 can also be performed from the sides quickly and safely. Additionally blade bias will be maintained for extended periods, requiring few adjustments and infrequent inspection. Also there are relatively few moving parts which can jam or accumulate debris and those which may jam, such as the lock pin 64, may be replaced easily and inexpensively.

It is to be understood that the invention is not limited to the precise constructional details shown in the drawings and described above and modifications may be made thereto as well as will other embodiments become apparent without departing from the spirit of the invention. For example instead of having two blades 20 supported against the conveyor belt, it is possible also to have one or three blades. If there is only one blade, then it is mounted directly on the rod 52, the pivoting mechanism being omitted since equilibrium between two or more blades is no longer required.

I claim:
1. A conveyor belt scraper comprising:
an elongate supporting frame;
means for mounting the supporting frame with respect to a conveyor belt;
elongate blade means mounted in the frame and guided to move laterally with respect to the frame toward and away from a conveyor belt with respect to which the frame is mounted;
at least one elongate strip element in engagement with the blade means for biasing the blade means with respect to the frame, the elongate strip element being at least partly flexible and at least partly longitudinally resilient and having its length extending substantially along the direction of the length of the blade means; and
means for tensioning the elongate strip element longitudinally by extending the longitudinally resilient part of the elongate strip element along the length of the strip element to urge the blade means against the conveyor belt.

2. The scraper of claim 1, wherein the elongate supporting frame includes two spaced, parallel strips that extend along the length of the blade means, the blade means being slidably guided between the strips.

3. The scraper of claim 2, wherein the strips are inclined oppositely to each other so that they taper in a direction facing the belt in use.

4. The scraper of claim 1, wherein the elongate element is entirely of a suitable resilient material.

5. The scraper of claim 4, wherein the resilient material is an appropriate elastomer.

6. The scraper of claim 1, wherein the elongate element is partly composed of suitable resilient material and partly of substantially inelastic material.

7. The scraper of claim 6, wherein the inelastic material is flexible.

8. The scraper of claim 7, wherein the flexible inelastic material is selected from a suitable braided strip of canvas, nylon, polyester and the like.

9. The scraper of claim 6, wherein at least one insert of stiff, non-flexible strip is included in the elongate element.

10. The scraper of claim 6, wherein the resilient material is selected from a suitable elastomer and a metal spring.

11. The scraper of claim 1, wherein the elongate element is accommodated in a channel extending along the length of the blade means.

12. The scraper of claim 1, wherein the blade means comprises a strip of suitable elastomer.

13. The scraper of claim 12, wherein the blade means comprises a laminated strip of at least one each of a suitable elastomer strip and a strip of a relatively harder non-elastomeric material.

14. The scraper of claim 11, wherein the channel in which the elongate element is guided is formed by parallel metal strips secured to the blade means along its edge remote from its working edge in use.

15. The scraper of claim 1, wherein the mounting means is constructed to engage a lateral frame of a conveyor belt apparatus and includes a connecting means for connecting the scraper to said lateral frame of a conveyor belt apparatus; a supporting means for supporting the elongate belt scraper; and first pivotable connecting means for connecting the supporting means to the connecting means, the pivotable connecting means having a pivot axis substantially parallel to the normal to the notional general plane of a conveyor belt to be scraped.

16. The scraper of claim 15 wherein the mounting means is constructed to support two elongate supporting frames and includes second pivotal connecting means having a pivot axis extending across the width of the belt in use, the two frames being supported on the second pivotal connecting means so as to be movable transversely relative to a belt to be scraped thereby automatically to adjust the forces exerted by the respective elongate blade means against the belt relative to one another.

17. A conveyor belt scraper comprising:

an elongate supporting frame;

means for mounting the supporting frame with respect to a conveyor belt;

elongate blade means mounted in the frame and guided to move laterally with respect to the frame towards and away from a conveyor belt with respect to which the frame is mounted;

at lease one elongate at least partly elastomeric strip element for biasing the blade means with respect to the frame and having its length extending substantially parallel to the length of the blade means and beyond the ends of the blade means; and means for tensioning each elongate strip element longitudinally by extending the elastomeric part of the elongate strip element to urge the blade means against the conveyor belt, the tensioning means comprising means to clamp each strip element at each end of the blade means with at least one of the clamp means comprising a locking mechanism that permits at least a portion of the strip element to be pulled in one direction only through the locking mechanism to tension the strip element and lock the strip against movement in the other direction.

18. A conveyor belt scraper comprising:

an elongate supporting frame;

means for mounting the supporting frame with respect to a conveyor belt;

elongate blade means mounted in the frame and guided to move laterally with respect to the frame towards and away from a conveyor belt with respect to which the frame is mounted;

at least one elongate element in engagement with the blade means for biasing the blade means with respect to the frame, the elongate element being at least partly flexible and at least partly longitudinally resilient and extending substantially along the direction of the length of the blade means;

a channel formation extending along the length of the blade means and formed by parallel strips secured to the blade means along its edge remote from its working edge in use, with the elongate element being accommodated in the channel formation; and means for tensioning the elongate element longitudinally to urge the blade means against the conveyor belt.

* * * * *